(12) United States Patent
Alexiou et al.

(10) Patent No.: US 8,774,085 B2
(45) Date of Patent: Jul. 8, 2014

(54) RELAYS IN WIRELESS COMMUNICATIONS

(75) Inventors: Angeliki Alexiou, Athens (GR); Federico Boccardi, Swindon (GB); Kai Yu, Stockholm (SE)

(73) Assignee: Alcatel Lucent, Paris (FR)

( * ) Notice: Subject to any disclaimer, the term of this patent is extended or adjusted under 35 U.S.C. 154(b) by 405 days.

(21) Appl. No.: 12/218,276

(22) Filed: Jul. 14, 2008

(65) Prior Publication Data

US 2009/0268657 A1    Oct. 29, 2009

(30) Foreign Application Priority Data

Jul. 20, 2007    (EP) .................................... 07252894

(51) Int. Cl.
*H04W 4/00*    (2009.01)

(52) U.S. Cl.
USPC .......... 370/327; 370/315; 370/437; 455/11.1; 455/16

(58) Field of Classification Search
None
See application file for complete search history.

(56) References Cited

U.S. PATENT DOCUMENTS

| | | | |
|---|---|---|---|
| 8,379,747 B2* | 2/2013 | Guthy et al. .................. 375/267 |
| 2004/0087324 A1* | 5/2004 | Ketchum et al. ............... 455/513 |
| 2004/0136349 A1* | 7/2004 | Walton et al. .................. 370/338 |
| 2004/0266339 A1* | 12/2004 | Larsson ............................ 455/7 |
| 2006/0039312 A1* | 2/2006 | Walton et al. .................. 370/319 |
| 2006/0056282 A1* | 3/2006 | Das et al. ....................... 370/208 |
| 2006/0056451 A1* | 3/2006 | Yano et al. ..................... 370/468 |
| 2006/0067277 A1 | 3/2006 | Thomas et al. |
| 2006/0121946 A1* | 6/2006 | Walton et al. .................. 455/561 |
| 2007/0049218 A1* | 3/2007 | Gorokhov et al. ............. 455/102 |
| 2007/0160014 A1* | 7/2007 | Larsson ........................ 370/338 |
| 2007/0258392 A1* | 11/2007 | Larsson et al. ................ 370/310 |
| 2008/0019262 A1* | 1/2008 | Lillie et al. .................... 370/208 |
| 2008/0037498 A1* | 2/2008 | Narayanan et al. ........... 370/342 |
| 2008/0205336 A1* | 8/2008 | Lee et al. ....................... 370/329 |
| 2009/0092087 A1* | 4/2009 | Walton et al. ................. 370/329 |

FOREIGN PATENT DOCUMENTS

| WO | WO 2005/064872 | 7/2005 |
|---|---|---|
| WO | WO 2007/003034 | 1/2007 |

OTHER PUBLICATIONS

European Search Report dated Jan. 24, 2008.
International Search Report and Written Opinion dated Oct. 1, 2008.
Hammerstrom, et al., "Allocation schemes for amplifying-and-forward MIMO-OFDM relay links", IEEE Transactions on Wireless Communications, IEEE USA, vol. 6, No. 8, Aug. 2007, pp. 2798-2802.
Zhang, Zheng, et al., "Information rates and coding for wireless MIMO relay channels", Vehicular Technology Conference, 2004. IEEE Sep. 26, 2004, pp. 1628-1629.

* cited by examiner

*Primary Examiner* — Donald Mills
(74) *Attorney, Agent, or Firm* — Fay Sharpe LLP

(57) ABSTRACT

A method is provided, in a wireless communications network comprising a source node, a destination node and at least one relay node, of selecting spatial subchannels for use. The method comprising the steps of: spatially decomposing channels into spatial subchannels; and selecting a subset of the subchannels for use that at least approximately maximises predicted throughput rate.

16 Claims, 5 Drawing Sheets

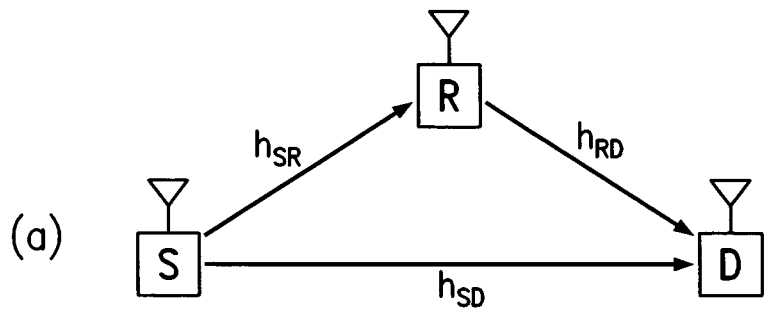
*FIG. 5*
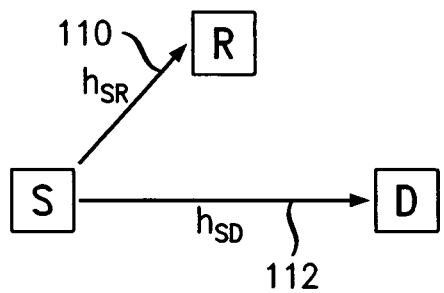
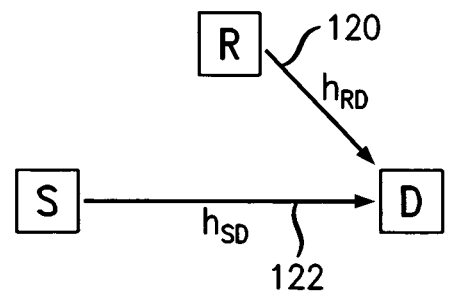
*FIG. 5A*
DOWNLINK
*FIG. 5B*
UPLINK

RELAYS IN WIRELESS COMMUNICATIONS

FIELD OF THE INVENTION

The present invention relates to telecommunications, in particular to wireless telecommunications.

DESCRIPTION OF THE RELATED ART

Wireless relay networks have attracted much attention recently, since use of relays can provide better coverage and/or higher network throughput, and hence improve the overall system performance, see for example, A. Nosratinia, T. E. Hunter, and A. Hedayat, "Cooperative communication in wireless networks", IEEE Communications Magazine, pp. 74-80, October 2004. Relays are network nodes additional to nodes acting as source and destination.

Relays give improvements in spatial diversity and spatial multiplexing. Spatial diversity is the ability to collect independently received samples containing the same transmitted data. By combining different independent received samples, the effect of channel fading may be reduced.

In spatial multiplexing, independent data is transmitted on each of the multiple spatial channels. If a relay is used as if a virtual antenna, these spatial channels may be directed towards a single user to increase the user's peak rate, or each channel may be directed to multiple users.

Various types of relays, for example, amplify-and-forward (AF) and decode-and-forward (DF) relay systems, have been considered in order to improve spectral efficiency and system performance. Since full-duplex relays are difficult and expensive to implement, relays are often assumed to be half-duplex, see for example R. U. Nabar, H. Bolcskei, and F. W. Kneubuhler, "Fading relay channels: performance limits and space-time signal design," IEEE Journal on Selected Areas in Communications, vol 22, no. 6, pp. 1099-1109, August, 2004. Half-duplex relays cannot receive and transmit at the same time, so half-duplex relays provide a two-phase transmission from source to destination, namely source to relay then relay to destination. This is not very efficient.

Antenna arrays can be used in relays. Also, transmission schemes of space-time division type have been applied in wireless networks involving relays, as described, for example, in J. N. Laneman and G. W. Wornell, "Distributed space-time-coded protocols for exploiting cooperative diversity in wireless networks," IEEE Transactions on Information Theory, vol. 49, no. 10, pp. 2415-2425, October 2003.

A multiple-input, multiple-output (MIMO) link refers to a communication system with multiple antennas at a transmitter and a receiver. MIMO links are a known effective way to increase link capacity of wireless links for a given bandwidth and power budget. The capacity gain results from the formation of multiple spatial subchannels (sometimes known as eigenmodes) that share common wireless frequency resources.

Approaches exploiting relays for improving data throughput are known, see for example H. Bölcskei, R. U. Nabar, Ö. Oyman. A. J. Paulraj, "Capacity Scaling Laws in MIMO Relay networks", IEEE *IEEE Transactions on Wireless Communications*, Vol. 5, No. 6, June 2006, in which maximum throughput rate is calculated under the assumption of amplify and forward relays. In A. Wittneben and B. Rankov, "Impact of Cooperative Relays on the Capacity of Rank-Deficient MIMO Channels", Proc. IST summit on Mobile Communications, June 2003, the asymptotic case (in terms of the number of relays) is considered.

Spatial multiplexing techniques have also been proposed to be used in distributed MIMO systems, as described in Q. Zhou, H. Zhang, and H. Dai, "Adaptive spatial multiplexing techniques for distributed MIMO systems," in Proceedings of Conference on Information Sciences and Systems, the Princeton University, March 2004.

Further general background is provided in the following three documents:

B. Rankov and A. Wittenben, "Spectral efficient protocols for half-duplex fading relay channels," IEEE Journal on Selected Areas in Communications, vol 25, no. 2, pp. 379-389, February, 2007.

F. Boccardi and H. Huang "A near optimum technique using linear precoding for the MIMO broadcast channel", in Proceeding of IEEE International Conference on Acoustics, Speech and Signal Processing (ICASSP), Honolulu, Hi., US, May 2007.

G. J. Foschini and M. J. Gans, "On limits of wireless communications in a fading environment when using multiple antennas", Wireless Pers. Commun., vol. 6, no.3, pp. 311-335, March 1998.

SUMMARY OF THE INVENTION

The reader is referred to the appended independent claims. Some preferred features are laid out in the dependent claims.

An example of the present invention is a method, in a wireless communications network comprising a source node, a destination node and at least one relay node, of selecting spatial subchannels for use. The method comprising the steps of: spatially decomposing channels into spatial subchannels; and selecting a subset of the subchannels for use that at least approximately maximises predicted throughput rate.

Preferred embodiments provide high data throughput by using relay nodes in wireless networks, for example multiple antenna systems. In some embodiments, multiple independent data streams can be sent over different spatial subchannels provided by relay nodes before collection at a destination. Channels are decomposed into spatial subchannels, and, in some embodiments, the set of subchannels that maximises the estimated throughput rate can be selected. Independent data streams can be sent via different subchannels. This approach is particularly suitable for channels which are at least partially correlated.

Due to the diversity effect provided by the use of relays overall throughput can grow as a number of candidate relays increases.

The present invention also relates to a corresponding method of transmitting data, and to a wireless communications network and a base station.

BRIEF DESCRIPTION OF THE DRAWINGS

An embodiment of the present invention will now be described by way of example and with reference to the drawings, in which:

FIG. 5 is a diagrammatic illustration of a simple example of the joint downlink/uplink subchannel selection (being that applied to single-input single-output (SISO) network), FIG. 5a is an illustration of the "downlink" subchannels shown in FIG. 5, FIG. 5b is an illustration of the "uplink" subchannels shown in FIG. 5.

DETAILED DESCRIPTION

We first describe an example of the approach at a high level, before going into detail how subchannels that give a good throughput rate are selected.

Figure 1:
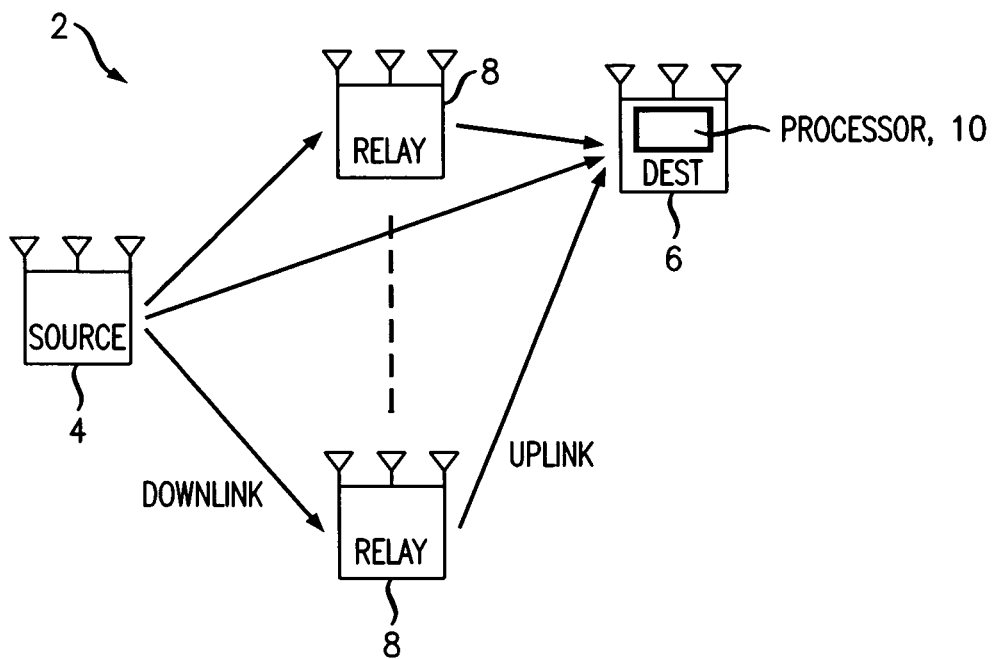
FIG. 1 is a diagram illustrating a wireless network.
Figure 1A:
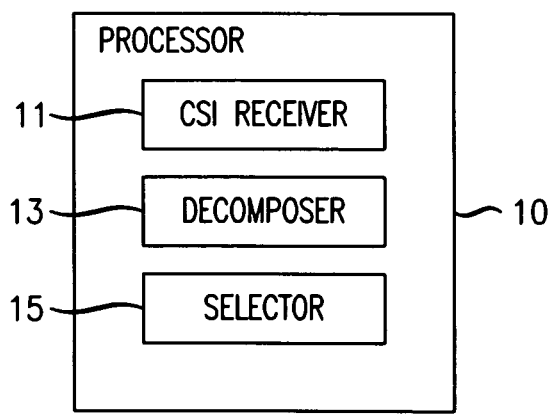
FIG. 1a is a diagram illustrating the processor shown in FIG. 1.

As shown in FIG. 1, a network 2 is shown. The network consists of wireless transmitter-receiver nodes, for simplicity with one source (S) node 4, one destination (D) node 6 and r relay nodes (R) 8. Each relay 8 is of a decode-and-forward type. Moreover each node is equipped with multiple antennas; more specifically $N_s$, $N_d$ and $N_r$ antennas are deployed respectively at the source, at the destination and at each of the r relays.

We assume an infinite buffer at the source side. We represent the channel response between each couple of transmit/receive antennas as a complex coefficient, in order to model the frequency response of a given carrier in an OFDM system. Let $H_{SD}$ be the $N_D \times N_S$ channel matrix between source and destination. Moreover, we indicate by $H_{SR_i}$, i=1, . . . , r the $N_R \times N_S$ channel matrix between the source and the ith relay, and by $H_{R_iD}$, i=1, . . . , r the $N_D \times N_R$ channel matrix between the ith relay and the destination.

Importantly, we consider the transmission as divided in two phases. During the first phase (downlink phase) the source transmits to a set (which is a subset of the relays and destination, to use mathematical notation,) $\Phi \subseteq \{R_1, \ldots, R_r, D\}$ of nodes. During the second phase (uplink phase) a second set of nodes $\Omega \subseteq \{\{\Phi \backslash D\} \cup S\}$ transmits to the destination.

In the following we give five example modes of operation for a network with one source (S), two relays ($R_1$, $R_2$) and one destination (D) each with $N_s=N_d=N_r=N$ antennas:

1) $\Phi=\{D\}$ and $\Omega=\{S\}$. The proposed scheme is equivalent to a known MIMO single user transmission between source and destination. Up to N spatial streams are available for transmission.

2) $\Phi=\{R_1\}$ and $\Omega=\{R_1\}$. The protocol corresponds to the known transmission between S and $R_1$ during the downlink phase and between $R_1$ and D during the uplink phase.

3) $\Phi=\{R_1, R_2\}$ and $\Omega=\{R_1, R_2\}$ During the downlink phase, up to N spatial streams are divided between $R_1$ and $R_2$. During the uplink phase $R_1$ and $R_2$ transmit up to M independent streams to the destination.

4) $\Phi=\{R_1, D\}$ and $\Omega=\{R_1, S\}$. During the downlink phase, up to N spatial streams are divided between $R_1$ and D. During the uplink phase $R_1$ and S transmit independent streams to the destination.

5) $\Phi=\{R_1, D\}$ and $\Omega=\{R_1\}$. During the downlink phase, up to N spatial streams are divided between $R_1$ and D. During the uplink phase $R_1$ transmits up to N independent streams to the destination.

Importantly, the independent streams are "routed" to different relays and sent directly to the destination by selecting subchannels for use in order to maximize the throughput. This approach is particularly appealing for correlated channels, where, due to the low rank of the channel matrix, is not possible to achieve the maximum number of independent transmitted streams ($N_{max}=\min(N_s, N_d)$): by using relays additional independent streams can be sent.

In this example network shown in FIG. 1, the subchannel selection processing is undertaken by a processor 10 in the destination node 6, with channel state information (CSI) from source node 4 and relays 8 provided as input to the destination node 6. The processor 10 processor comprising a receiver stage 11 operative to receive channel status information, a decomposer stage 13 operative to decompose channels into spatial subchannels, and a selector 15 operative to select a subset of the spatial subchannels for use.

In this example network, the nodes 4,6,8 are WIMAX base stations. In other, otherwise similar embodiments (not shown) the nodes are of another type or types, for example Universal Mobile Telecommunications System (UMTS)/Long Term Evolution (LTE) base stations.

We now describe a possible way of firstly realising the spatial channel decomposition and then selecting the set of subchannels for use in transmission.

Subchannel Selection by a Channel Decomposition Approach

Figure 2:
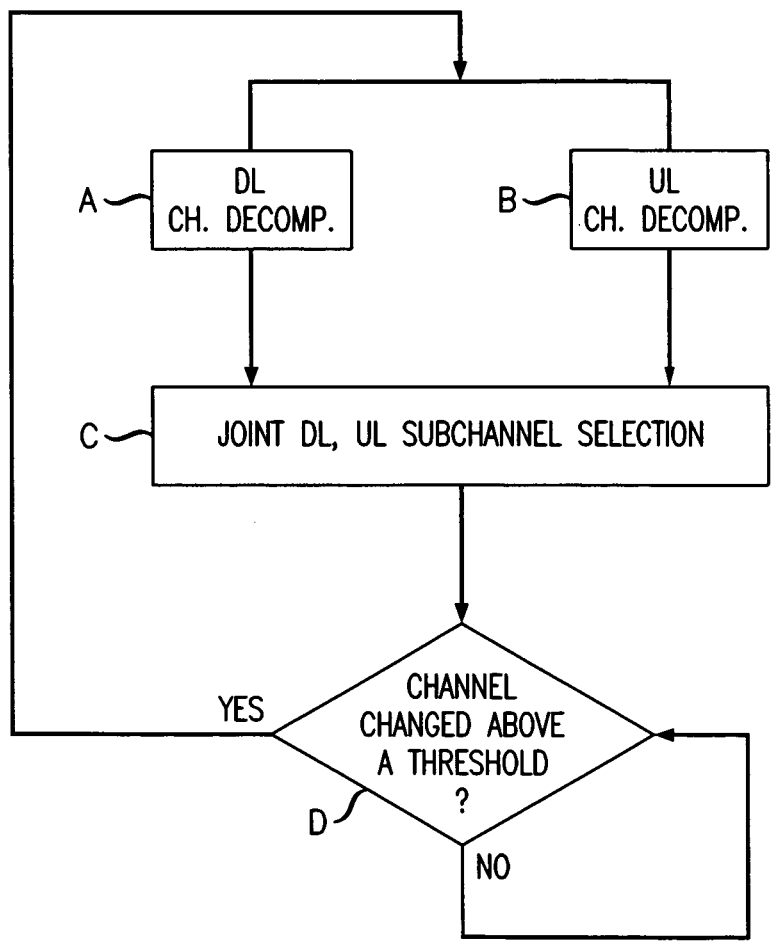
FIG. 2 is a flowchart illustrating operation of the wireless network of FIG. 1 in determining subchannels for improved throughput.

As shown in FIG. 2, the operation of the processor 10 is first to decompose (step A) channels on the downlink (source to relays), and decompose (step B) channels on the uplink (relays to destination). Spatially independent subchannels for use are then selected (step C) from consideration of predicted data throughput rates that subchannels provide. This is sometimes referred to in this document as Joint downlink/uplink subchannel selection.

These decomposition (step A, step B) and subchannel selection (step C) operations are described in more detail below. The selected subchannels are used until channel variation above a preset threshold is detected (step D), in which case the steps of channel decomposition (step A, step B) and subchannel selection (step C) is repeated.

This processing requires an analytic model to be applied as explained below.

Importantly source to relay is referred to as downlink, and relay to destination is referred to as uplink.

An example application for this method is a wireless backhaul network as there source, destination, and relay nodes are unmoving so radio conditions are relative static. As shown in FIG. 2, selected subchannels are used until channel variations above a predetermined threshold are detected, in which case the process of channel decomposition and subchannel selection is done again. Of course, in other embodiments, a node or nodes can be moving.

We now explain the analytic model used and its application to channel decomposition in respect of the "downlink" and "uplink" links. After that we will look at how to select subchannels giving good throughput ("Joint downlink/uplink subchannel selection).

(a) Basic Analysis Model Used

Figure 3:
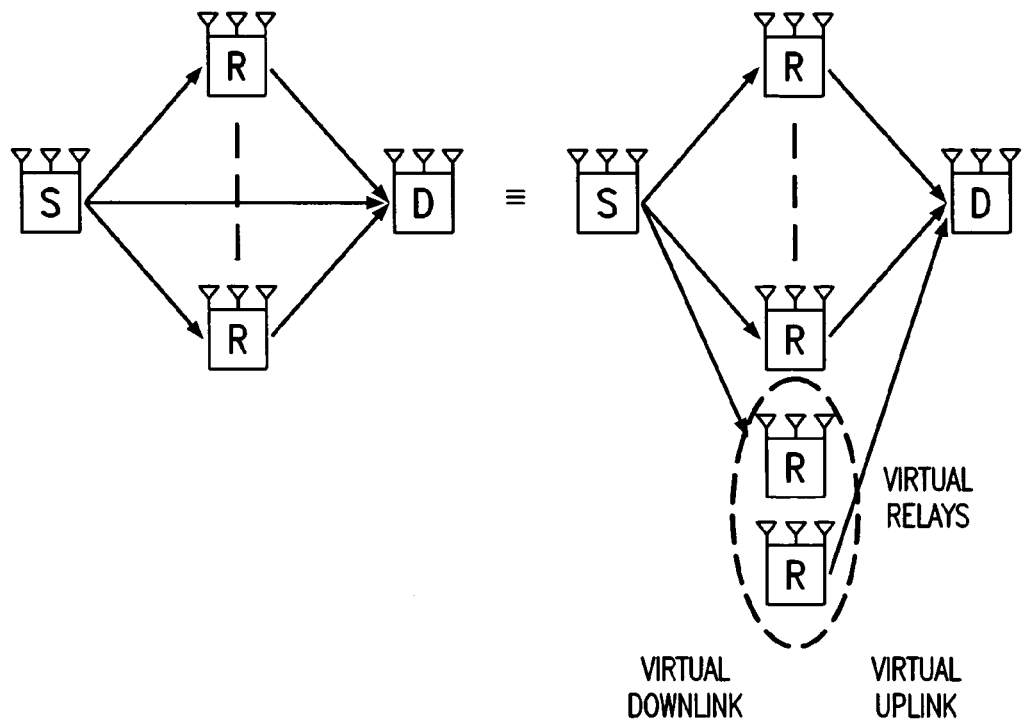
FIG. 3 is a diagram illustrating the analytical model applied so as to enable subchannel selection.
Figure 4:
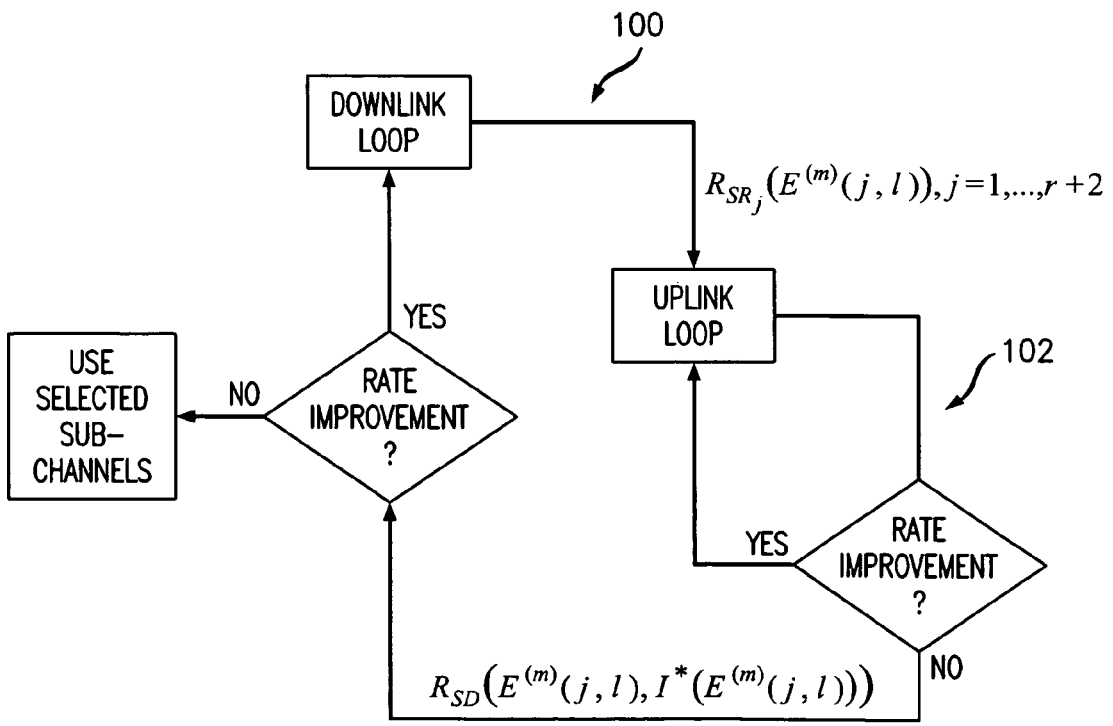
FIG. 4 is a flowchart illustrating a practical iterative method of the joint downlink/uplink subchannel selection stage of the process shown in FIG. 2.

As shown in FIG. 3, the network shown in FIG. 1 is equivalently modelled by introducing two virtual relays. More specifically the link between the source and the first virtual relay (indicated with the index r+1) models the direct link between source and destination during the downlink phase. The link between the second virtual relay (indicated with the index r+2) and the destination models the direct link between source and destination during the uplink phase.

The channel matrices associated to the virtual relay r+1 are defined a follows $$H_{SR_{r+1}}=H_{SD} \quad H_{R_{r+1}D}=0_{N_D \times N_S} \tag{0.1}$$

where $0_{N_S \times N_D}$ denotes the $N_S \times N_D$ null matrix. The channel matrices associated to the virtual relays r+2 are defined as $$H_{SR_{r+2}} = 0_{N_S \times N_D} H_{R_{r+2}D} = H_{SD}. \quad (0.2)$$

Keeping in mind the definitions introduced in Eq. (0.1) and Eq. (0.2), in this document we will refer to a system with r+2 relays without differentiating (unless differently specified) between relays and virtual relays. In the same way $\Phi$ and $\Omega$ will refer to a given set of nodes in the original setup with direct connection between source and destination or to the associated set of nodes in the equivalent setup using virtual relays.

(b) Downlink Phase

We now apply the above-mentioned analytic model to the downlink.

(b. i) Downlink Phase—Downlink Model

The received signal at the jth relay during the downlink phase can be written as $$y_{R_j} = H_{SR_j} x_S + n_{SR_j} j \in \Phi \quad (0.3)$$

where $x_S$ is the $N_S \times 1$ vector transmitted by the source, whereas $n_{SR_j}$ is the vector of i.i.d. complex additive white Gaussian noise samples $n_{SR_j} \sim CN(0,I)$.

The transmit signal is subject to the following sum-power constraint $$E[tr[x_S x_S^H]] \leq P \quad (0.4)$$

and can be written as $$x_S = \sum_{j \in \Phi} G_j d_{SR_j}$$

where $G_j$ is the $N_S \times |E_j|$ complex precoding matrix associated to the jth active relay, $d_{SR_j}$ is the $|E_j| \times 1$ data symbol vector sent to the jth active relay, and $E_j$ is the spatial subchannnels (in other words, eigenmodes) allocated to the jth active relay.

(b. ii) Downlink Phase—Relay Channel Decomposition into Indep. MIMO Channels

The channel between source and the jth relay can be decomposed using the singular value decomposition (SVD) as $H_{SR_j} = U_{SR_j} \Sigma_{SR_j} V_{SR_j}^H$, where the eigenvalues in $\Sigma_{SR_j}$ are arranged so that the ones associated with the allocated set $E_j$ appear in the leftmost columns. We denote these eigenvalues as $\Sigma_{SR_j,1}, \ldots, \Sigma_{SR_j,|E_j|}$. The jth node's receiver is a linear detector given by the Hermitian transpose of the leftmost $|E_j|$ columns of $U_{SR_j}$ which we denote as $u_{SR_j,1}, \ldots, u_{SR_j,|E_j|}$. Likewise, we denote the leftmost columns of the matrix $V_{SR_j}$ as $v_{SR_j,1}, \ldots, v_{SR_j,|E_j|}$. The signal following the detector can be written as $$r_{SR_j} = [u_{SR_j,1} \ldots u_{SR_j,|E_j|}]^H y_{SR_j} \quad (0.5)$$
$$= \Gamma_{SR_j} G_j d_{SR_j} + \Gamma_{SR_j} \sum_{i \in \Phi, i \neq j} G_i d_{SR_i} + n'_{SR_j}$$

where $y_{SR_j}$ is the received signal given at the jth relay, $n'_j$ the processed noise, and $\Gamma_{SR_j} = [\Sigma_{SR_j,1} v_{SR_j,1} \ldots \Sigma_{SR_j,|E_j|} v_{SR_j,|E_j|}]^H$ is a $|E_j| \times N_S$ matrix.

By defining the $$\sum_{i \neq j, i \in \Phi} |E_i| \times N_S$$

matrix $\tilde{H}_{SR_j}$ $$\tilde{H}_{SR_j} = [\Gamma_{SR_1}^H \ldots \Gamma_{SR_{j-1}}^H \Gamma_{SR_{j+1}}^H \ldots \Gamma_{SR_{|\Phi|}}^H]^H,$$

our zero-forcing constraint requires that $G_j$ lies in the null space of $\tilde{H}_{SR_j}$. Hence $G_j$ can be found by considering the SVD of $\tilde{H}_{SR_j}$:

$$\tilde{H}_{SR_j} = \tilde{U}_{SR_j} \tilde{\Sigma}_{SR_j} [\tilde{V}_{SR_j}^{(1)} \tilde{V}_{SR_j}^{(0)}]^H,$$

where $\tilde{V}_{SR_j}^{(0)}$ corresponds to the right eigenvectors associated with the null modes. From the relation between rank and null space of $\tilde{H}_{SR_j}$, the following constraint has to be satisfied $$\sum_{i \neq j, i \in \Phi} |E_i| < N_S$$

for each $j \in \Phi$.

(b. iii) Downlink Phase—Decomposition of each MIMO Channel into Spatially Independent Subchannels The jth relay's precoder matrix is given by $G_j = \tilde{V}_{SR_j}^{(0)} C_j$ where $C_j$ is determined later. Note that since $\tilde{H}_{SR_i} \tilde{V}_{SR_i}^{(0)} = 0$ for all $j \in \Phi$, it follows that $\Gamma_{SR_i} G_i = \Gamma_{SR_i} \tilde{V}_{SR_i}^{(0)} C_i 0$ for $i \neq j$ and any choice of $C_i$. Therefore from (0.5), the received signal at the jth relay after combining contains no interference:

$$r_{SR_j} = \Gamma_{SR_j} G_j d_{SR_j} + n'_{SR_j}. \quad (0.6)$$

We perform an SVD $$\Gamma_{SR_j} \tilde{V}_{SR_j}^{(0)} = \overline{U}_{SR_j} [\overline{\Sigma}_{SR_j} 0] [\overline{V}_{SR_j}^{(1)} \overline{V}_{SR_j}^{(0)}]^H,$$

where $\overline{\Sigma}_{SR_j}$ is the $|E_j| \times |E_j|$ diagonal matrix of eigenvalues, and we assign $C_j = \overline{V}_{SR_j}^{(1)}$. From (0.6), the resulting rate received by the jth node during the downlink phase is $$\sum_{k \in E_j} \log\left(1 + \overline{\sigma}_k^{(j)2} w_k^{(j)}\right),$$

where $\overline{\sigma}_k^{(j)2}$ is the kth diagonal element of $\overline{\Sigma}_{SR_j}^2$ ($k \in E_j$), $W_j$ is the $|E_j| \times |E_j|$ diagonal matrix of powers allocated to the subchannels, and $w_k^{(j)}$ is the kth diagonal element. Therefore the total transmitted power for this user is $tr[G_j W_j G_j^H] = tr W_j$. Letting T be a given selection of users $\Phi$ and subchannels $E_k$ ($j \in \Phi$), the power allocation problem for maximizing the sum rate given T can be found by using a waterfilling power allocation.

(c) Uplink Phase

We now turn to applying the above mentioned analytic model to the uplink.

(c. i) Uplink Phase—Uplink Model

The received signal at the destination during the uplink phase can be written as $$y_D = \sum_{j \in \Omega} H_{R_j D} x_{R_j} + n_D \quad (0.7)$$

where $x_{R_j}$ is the $N_R \times 1$ vector transmitted by ith relay whereas $n_D$ is the vector of i.i.d. complex additive white Gaussian noise samples $n_D \sim CN(0,I)$.

We consider two types of power constraints:
Power constraint on the sum of the power transmitted by the different relays:

$$\sum_{j \in \Omega} E[\|x_{R_j}\|_2^2] \leq P \quad (0.8)$$

Separated power constraints at each relay:

$$E[\|x_{R_j}\|_2^2] \leq P \, j \in \Omega \quad (0.9)$$

The first approach is more suitable for network of battery-powered nodes where the energy consumption reduction with under a given performance target is the goal.

The second type of power constraint is more suitable where the nodes are attached to a fixed power supply and the goal is the maximization of the throughput.

In the remaining of this section we will extend the idea of spatial decomposition described for the downlink in the previous section to an uplink transmission.

(c. ii) Uplink Phase—Relay Channel Decomposition into Indep. MIMO Channels

The signal transmitted at the jth relay can be written as $$x_{R_j} = F_j d_{R_j}$$

where $F_j$ is the $N_R \times |I_j|$ precoding matrix used at the jth active relay, whereas $d_{R_j}$ is the $|I_j| \times J$ data symbol vector transmitted from the jth relay and $|I_j|$ is the set of subchannels allocated to the jth active node during the uplink phase.

Equivalently to the downlink case, we decompose each matrix $H_{R_jD}$ $j \in \Omega$ by using an SVD $$H_{R_jD} = U_{R_jD} \Sigma_{R_jD} V_{R_jD}^H.$$

Also in this case the eigenvalues in $\Sigma_{R_jD}$ are arranged so that the ones associated to the set of allocated modes appear in the leftmost columns. These subchannels are denoted as $\Sigma_{R_jD,1}, \ldots, \Sigma_{R_jD,|I_j|}$.

Differently from the previous case, where the set of active subchannels for a given link was added at the receiver side by using a linear detector, in this case each relay selects the set of active modes at the transmit side by properly designing $F_j$ $$F_j = [v_{R_jD,1}, \ldots, v_{R_jD,|I_j|}] C_{R_j}$$

where $v_{R_jD,i}$ is the right eigenvector associated to the ith subchannel, and $C_{R_jD}$ is a matrix that will be determined later.

The received signal at the destination (0.7) can be rewritten as $$y_D = \sum_{j \in \Omega} H_{R_jD} F_j C_j d_{R_jD} + n_D$$

$$= \sum_{j \in \Omega} \Gamma_{R_jD} C_j d_{R_jD} + n_D$$

where $\Gamma_{R_jD} = [\Sigma_{R_jD,1} u_{R_jD,1}, \ldots, \Sigma_{R_jD,|I_j|} u_{R_jD,|I_j|}]$ is a $N_D \times |I_j|$ matrix.

By defining the $$N_D \times \sum_{i \in \Omega, i \neq j} |I_i|$$

matrix $$\tilde{H}_{R_jD} = [\Gamma_{R_1D}, \ldots, \Gamma_{R_{j-1}D}, \Gamma_{R_{j+1}D}, \ldots, \Gamma_{R_{|\Omega|}D}] = [\tilde{U}_{R_jD}^{(1)} \tilde{U}_{R_jD}^{(0)}] \tilde{\Sigma}_{R_jD} \tilde{V}_{R_jD}^H$$

the receiver matrix used at the destination to detect the signal of the jth relay is designed as follows $$L_j = D_j \tilde{U}_{R_jD}^{(0)H}$$

where $D_j$ will be determined later. Note that $\tilde{U}_{R_jD}^{(0)H} \tilde{H}_{R_jD} = 0$ for all the $j \in \Omega$, and it follows that the received signal after the combining matrix associated with the jth relay can be written as $$r_{R_jD} = L_j y_D = D_j \tilde{U}_{R_jD}^{(0)H} \Gamma_{R_jD} C_j d_{R_jD} + n'_D$$

where $n'_D$ is the processed noise after the combiner $n'_D = L_j n_D$.

(c. iii) Uplink Phase—Decomposition of each MIMO Channel into Spatially Independent Subchannels As a result of the processing described above, the links between the $|\Omega|$ active relays and the destinations, are now spatially separated and single user MIMO like techniques can be used to achieve the capacity of each equivalent channel $\tilde{U}_{R_jD}^{(0)H} \Gamma_{R_jD}$ $j \in \Omega$. In particular, as for the downlink case described in the previous section, the matrices $D_j$ and $C_j$ can be determined by performing the SVD of $\tilde{U}_{R_jD}^{(0)H} \Gamma_{R_jD}$ and using a waterfilling power allocation satisfying either the common power constraint (0.8) or the separated power constraint (0.9). We observe that $L_j$ and $F_j$ are unitary, and therefore the former does not affect the per-component variance of the additive noise at each antenna, whereas the latter does not affect the transmit power at the transmitter side.

(d) Maximising Throughput by Joint Downlink/Uplink Subchannel Selection

Let $E = E_1 \cup E_2 \cup \ldots \cup E_{r+2}$ be a set of selected subchannels for the downlink phase, and $I = I_1 \cup I_2 \cup \ldots \cup I_{r+2}$ a set of selected subchannels for the uplink phase.

Let $R_{SR_j}(E)$ the maximum throughput rate between the source and the jth relay during the downlink phase under the assumption that the set of subchannels E has been selected. Moreover, let $R_{R_jD}(I)$ the maximum mutual information between the jth relay and the destination during the uplink phase under the assumption that the set I has been selected. We recall that using the virtual relay model of FIG. 3, the r+2th relay corresponds to the source; for this reason we put $R_{SR_{r+2}}(E) = \infty$ for every E. With the same motivations, considering that the r+1th relay corresponds to the destination, we put $R_{R_{r+1}D}(I) = \infty$ for every I.

The maximum throughput rate between source and destination for a given uplink/downlink couple (E, I) is given by $$R_{SD}(E, I) = \frac{1}{2} \sum_{i=1}^{r+2} \min(R_{SR_i}(E), R_{R_iD}(I))$$

The maximum mutual information between source and destination with respect to all the possible couples (E, I) is given by $$R_{SD}^* = \max_{(E,I)} R_{SD}(E, I) \quad (0.10)$$

Applying equation (0.10) involves a search over all the possible subchannel allocations. Such a "brute force" search is practical in a simple system having few relays and antennas per node, but soon becomes impractical for more complex systems.

(d. i) Practical ("Greedy") Subchannel Selection Method

In order to lower the computational complexity, we propose an iterative downlink/uplink optimization algorithm where the set of active subchannels E and I are updated in an iterative way. The proposed algorithm is composed by two loops: the external loop updates the value of E, whereas the internal loop, for each candidate E, calculates a practical "best" set I. We define as $E^{(m)^*}$ the value of E found at the mth stage of the external loop. We emphasize that this value does not correspond to the optimum one that would have been obtained by a brute force search over $$\sum_{l=1}^{min(m,N_s)} \left( \frac{\left(\sum_{j=1}^{r+2} N_j\right)!}{\left(\sum_{j=1}^{r+2} N_j - l\right)! l!} \right)$$

where $N_j = N_r$ if $1 \le j \le r$, $N_j = N_d$ if $j = r+1$ and $N_j = N_s$ if $j = r+2$. The candidate set $E^{(m)}$ is defined as $$E^{(m)}(j,l) = E^{(m-1)^*} \bigcup_{\sum_{SR_{j,l}} \notin E^{(m-1)^*}} \sum_{SR_{j,l}}$$

where $j=1, \ldots, r+2$ and $l=1, \ldots, \min(N_s, N_j)$.

Let's define $E^{(0)^*} = \phi$ where $\phi$ is the empty set. The value found at the end of the mth iteration of the external loop is given by $$E^{(m)^*} = \underset{E^{(m)}(j,l)}{\mathrm{argmax}} R_{SD}(E^{(m)}(j,l), I^*(E^{(m)}(j,l)))$$

where $I^*(E^{(m)}(j,l))$ is the practical best subchannel allocation for the uplink part given the downlink subchannel allocation $E^{(m)}(j,l)$.

With the same motivations as for the outer loop, also in the inner loop we use a practical selection algorithm to find $I^*(E^{(m)}(j,l))$. Leaving implicit the dependence on $E^{(m)}(j,l)$, we define a possible candidate $I^{(n)}$ set during the nth iteration of inner loop as $$I^{(n)}(u,v) = I^{(n-1)^*} \bigcup_{\sum_{R_uD,v} \notin I^{(n-1)^*}} \sum_{R_uD,v}$$

Let $I^{(0)^*} = \phi$. The uplink subchannel allocation set found at the end of nth iteration of the external loop is given by $$I^{(n)^*}(E^{(m)}(j,l)) = \underset{I^{(n)}(u,v)}{\mathrm{argmax}} R_{SD}(E^{(m)}(j,l), I^{(n)}(u,v)).$$

Leaving implicit the dependence of $I^{(n)^*}$ and $I^{(n-1)^*}$ on $E^{(m)}(j,l)$, if the following condition is found at the nth iteration of the inner loop $$R_{SD}(E^{(m)}(j,l), I^{(n)^*}) < R_{SD}(E^{(m)}(j,l), I^{(n-1)^*})$$

the inner loop is stopped and the value $I^*(E^{(m)}(j,l)) = I^{(n-1)^*}$ is returned to the outer loop. In the same way, at the mth iteration of the outer loop if the following condition is found $$R_{SD}(E^{(m)^*}, I^*(E^{(m)^*})) < R_{SD}(E^{(m-1)^*}, I^*(E^{(m-1)^*}))$$

the loop is interrupted ant the couple $(E^{(m-1)^*}, I^*(E^{(m-1)^*}))$ is returned as output of the algorithm.

The result of this process is that channels are selected for use which provide approximately near-maximum data throughput rate.

To aid understanding of this practical ("greedy") scheme for joint downlink/uplink subchannel selection, two simple examples are described below, one SISO, the other 2×2 MIMO.

(d.ii) First Example of Practical ("Greedy") Subchannel Selection Method: SISO

As shown in FIG. 5, in a single-input, single-output network, each of the source node S, the destination node D, and the relay node R, has a single antenna. Each link between nodes has an associated single subchannel. Considering downlink and uplink separately, as shown in FIG. 5a there is a downlink (source to relay) subchannel 110 and a what is considered a downlink (source to destination) subchannel 112. As shown in FIG. 5b, there is an uplink (relay to destination) 120 and what is considered an uplink (source to destination) channel 122.

The joint downlink/uplink subchannel selection procedure is as follows:

1). test source to relay subchannel 110 by finding the minimum of: the throughput rate provided by subchannel 110 and the greater of the throughput rates provided by each of subchannels 120 and 122, 2). test downlink source to destination subchannel 112 by finding the minimum of: the throughput rate provided by subchannel 112 and the greater of the throughput rates provided by each of subchannels 120 and 122, 3). choose, between subchannels 110 and 112, the subchannel 110 or 112 that from steps 1 and 2 above has the highest associated throughput rate.

(d.iii) Second Example Practical ("Greedy") Subchannel Selection Method: MIMO

Figure 6:
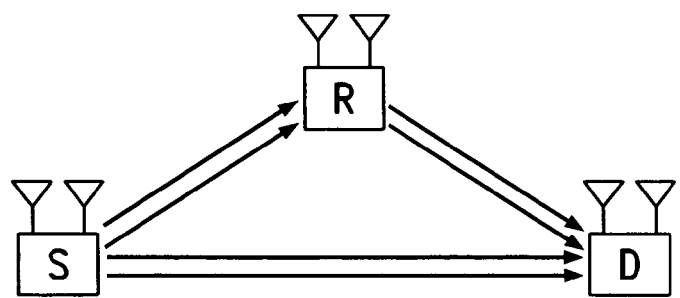
FIG. 6 is a diagrammatic illustration of an example of the joint downlink/uplink subchannel selection applied to multiple-input multiple-output (MIMO) network.
Figure 6A:
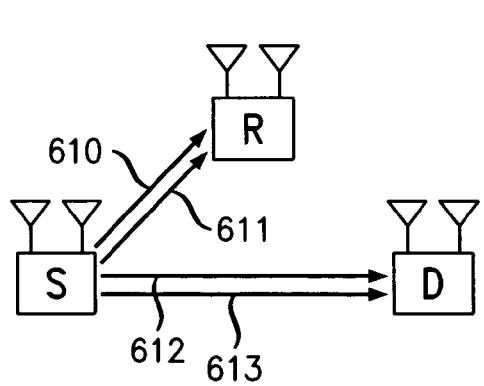
FIG. 6a is an illustration of the "downlink" subchannels shown in FIG. 6.
Figure 6B:
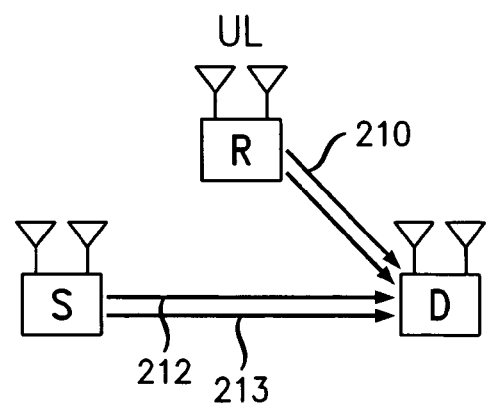
FIG. 6b is an illustration of the "uplink" subchannels shown in FIG. 6.

As shown in FIG. 6, in a simple multiple-input, multiple-output network, each of the source node S, the destination node D, and the relay node R, has a two antennas. We assume that the relay channel has already been decomposed into independent MIMO channels, and MIMO channels have already been decomposed into independent spatial subchannels, denoted, as shown in FIGS. 6a and 6b, 610 to 613 on the downlink, and 210 to 213 on the uplink.

The joint downlink/uplink subchannel selection procedure is as follows:

1). test source to relay subchannel 610 by finding the minimum of: the throughput rate provided by subchannel 610 and the greater of the summed throughput rate provided by the pair of subchannels 210 and 211 and the summed throughput rate provided by the pair of subchannels 212 and 213;

2). test downlink source to destination subchannel 611 by finding the minimum of: the throughput rate provided by subchannel 610 and the greater of the summed throughput rate provided by the pair of subchannels 210 and 211 and the summed throughput rate provided by the pair of subchannels 212 and 213;

3). test source to relay subchannel 612 by finding the minimum of: the throughput rate provided by subchannel 610 and the greater of the summed throughput rate provided by the pair of subchannels 210 and 211 and the summed throughput rate provided by the pair of subchannels 212 and 213;

4). test downlink source to destination subchannel 613 by finding the minimum of: the throughput rate provided by subchannel 610 and the greater of the summed throughput rate provided by the pair of subchannels subchannels 210 and 211 and the summed throughput rate provided by the pair of subchannels 212 and 213;

5). choose, from among subchannels 610, 611, 612, and 613, the one having the highest associated throughput rate or summed throughput rate as determined by steps 1 to 4 above.

Let us assume in this example that subchannel 612 is the one chosen, the procedure continues as follows:

6). test the combination of subchannels 612 and 610 by finding the minimum of: the summed throughput rate provided by subchannels 612 and 610 and the greater of the summed throughput rate provided by the pair of subchannels 210 and 211 and the summed throughput rate provided by the pair of subchannels 212 and 213;

7). test the combination of subchannels 612 and 611 by finding the minimum of: the summed throughput rate provided by subchannel 612 and 611 and the greater of the summed throughput rate provided by the pair of subchannels 210 and 211 and the summed throughput rate provided by the pair of subchannels 212 and 213;

8). test the combination of subchannels 612 and 613 by finding the minimum of: the summed throughput rate provided by subchannels 612 and 613 and the greater of the summed throughput rate provided by the pair of subchannels 210 and 211 and the summed throughput rate provided by the pair of subchannels 212 and 213;

9). choose, from among the subchannel/subchannel combinations referred to in steps 3, 6, 7, and 8 above, namely: 612 alone, 612 with 610, 612 with 611, and 612 with 613, the subchannel/subchannel combination having the highest associated throughput rate or summed throughput rate as determined by steps 3, 6, 7, and 8 above.

General

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method, in a wireless communications network comprising a source node, a destination node and at least one relay node, of selecting spatial subchannels for use, the method comprising:
   via a destination node processor, spatially decomposing channels into spatial subchannels, the subchannels into which the channels are decomposed comprising the subchannels from the source node to each relay node and the subchannels from each relay node to the destination node, wherein the subchannels have the same frequency; and
   via the destination node processor, selecting a subset of the subchannels for use that at least approximately maximises predicted throughput rate; in which the network is a MIMO network in which the source node and the destination node each comprise a plurality of antennas; and
   transmitting data over the selected subchannels.

2. A method according to claim 1, in which the subchannels are spatially independent.

3. A method according to claim 1, in which selecting a subset of the subchannels for use further comprises for each of a series of subsets of spatial channels determining predicted throughput rate, and then selecting the subset giving the maximum determined predicted throughput rate.

4. A method according to claim 3, in which subchannels are selected for use in an iterative process, in which at each iteration an additional subchannel is added into the subset for which predicted throughput rate is determined, the subset of subchannels selected for use being that for which no further improvement in predicted throughput rate is determined as compared to the previous iteration.

5. A method according to claim 4, in which the channels are made spatially independent by preceding for transmission and combining of received signals upon reception.

6. A method according to claim 1, in which the spatial decomposing is by decomposing the channels into MIMO-channels, and decomposing MIMO-channels into spatially independent subchannels.

7. A method according to claim 1, in which each of said source node, said destination node, and said at least one relay node each comprises a plurality of antennas.

8. A method according to claim 1, in which selected subchannels are used until it is determined that a characteristic of the channel has changed by more than a predetermined amount, then further steps are undertaken of spatially decomposing channels into spatial subchannels and selecting a subset of the subchannels for use that maximises predicted throughput rate.

9. A wireless communications network comprising:
   a source node;
   a destination node;
   at least one relay node;
   a processor having a receiver stage, a decomposer stage, and a selector; the receiver stage being operative to receive channel status information; the decomposer stage being operative to decompose channels into spatial subchannels, the subchannels into which the channels are decomposed comprising the subchannels from the source node to each relay node and the subchannels from each relay node to the destination node, wherein the subchannels have the same frequency; the selector being operative to select a subset of the spatial subchannels for use that at least approximately maximises predicted throughput rate; the processor being operative to use the selected subchannels for data transmission, in which the network is a MIMO network in which the source node and the destination node each comprise a plurality of antennas.

10. A wireless communications network according to claim 9, in which said processor is in one of the source node, the destination node or one of said at least one relay node.

11. A wireless communications network according to claim 10, in which the node comprising the processor informs the other nodes of which spatial subchannels to use.

12. A wireless communications network according to claim 11, in which the node comprising the processor also informs the other nodes of what precoding to apply for transmission and what combining of received signals to apply for reception.

13. A node for use in a wireless communications network, the node comprising: a processor comprising: a receiver stage operative to receive channel status information of channels between a source node, a destination node and at least one relay node in which the network is a MIMO network in which the source node and the destination node each comprise a plurality of antennas, wherein the subchannels have the same frequency; a decomposer stage operative to decompose channels into spatial subchannels, the subchannels into which the channels are decomposed comprising the subchannels from the source node to each relay node and the subchannels from each relay node to the destination node; and a selector operative to select a subset of the spatial subchannels for use that at least approximately maximises predicted throughput rate.

14. A node according to claim 13, wherein the decomposer stage is further operative to decompose channels into spatial subchannels in a linear manner.

15. A wireless communications network according to claim 9, wherein the decomposer stage is further operative to decompose channels into spatial subchannels in a linear manner.

16. A method according to claim 1, wherein the channels are spatially decomposed into spatial subchannels in a linear manner.

* * * * *